United States Patent [19]

Bari et al.

[11] 3,789,370

[45] Jan. 29, 1974

[54] MULTIPLE ELECTRON MIRROR APPARATUS AND METHOD

[75] Inventors: Jaime A. Bari; Kent N. Maffitt, both of Minneapolis; Jerry A. Sievers, St. Paul, all of Minn.

[73] Assignee: Minnesota Mining and Manufacturing Company, St. Paul, Minn.

[22] Filed: July 18, 1972

[21] Appl. No.: 272,779

[52] U.S. Cl. ........ 340/173 CR, 250/311, 178/6.6 A

[51] Int. Cl. ........ G11c 11/26

[58] Field of Search ...... 250/311, 307; 340/173 CR; 178/6.6 A

[56] References Cited

UNITED STATES PATENTS

| | | | |
|---|---|---|---|
| 3,641,510 | 2/1972 | Chen | 340/173 CR |
| 3,671,743 | 6/1972 | Nixon | 250/311 |
| 3,711,711 | 1/1973 | Dao | 250/311 |

*Primary Examiner*—Terrell W. Fears

*Attorney, Agent, or Firm*—Alexander, Sell, Steldt & Delahunt

[57] ABSTRACT

An information storage and retrieval system with a large storage capacity and having a write and a read mode of operation is provided by using a plurality of electron mirrors. Preferably three electron mirrors are used of which one is a modulating electron mirror and the other two are storage electron mirrors with each storage mirror having a plurality of storage areas. The electron beam is directed by a magnetic prism and appropriate biasing of the electron mirrors. During the write mode, the electron beam is mirrored by the modulating mirror and a page (a plurality of bits) of input information presented as a pattern of charge at the modulating mirror modulates the beam. The mirrored electron beam is directed to an addressed storage area of a selected storage mirror where the entire page of information contained in the modulated beam is stored as a pattern of charge. The same page can also be stored at the second storage mirror to improve the reliability of the apparatus during the read mode. During the read mode the electron beam is mirrored without modulation except at a storage mirror to be read where it is directed to a storage area for modulation and is then presented to a readout array where all bits of information represented by the modulation are read simultaneously.

26 Claims, 13 Drawing Figures

MULTIPLE ELECTRON MIRROR APPARATUS AND METHOD

BACKGROUND OF THE INVENTION

1. Field of the Invention

The invention presented herein relates to information storage and retrieval and in particular to an information storage and retrieval apparatus and method using electron mirror techniques.

2. Discussion of the Prior Art

The invention presented herein utilizes known principles of electron mirror operation which are described in reference to FIG. 1 of the drawing. FIG. 1 shows a simple electron mirror arrangement which includes an apertured plate 1 which is positioned parallel to and spaced a few millimeters from the mirror surface 2. The space between the apertured plate 1 and the mirror surface 2 is referred to as the mirror region. A strong electric field is maintained in the mirror region by biasing the apertured plate a few kilovolts positive and the mirror surface 2 a few volts negative relative to the electron source. This mirror bias can be adjusted so the electrons directed into the mirror region do not have sufficient energy to reach the specimen surface 2 and consequently execute the parabolic paths 3 shown in FIG. 1. If these parabolic paths are unperturbed by the surface 2, the cross-section of the mirrored beam is uniform in density. However, field gradients can be present due to such things as variations in the surface topography, electrical charge distribution or magnetization of the surface 2 to produce perturbations of the parabolic paths. The effect produces spatial modulation of the density of the mirrored beam. A visual observation of this modulation action can be provided by allowing the modulated beam to impinge on a phosphor screen where the modulation will be observed as a mirror image of the condition present at the mirror surface 2.

The distance from the mirror surface 2 to the point at which the electrons reverse their direction can be increased by making the mirror bias more negative relative to the electron source. This reduces the spatial modulation of the beam. The mirror bias therefore provides a means for permitting or preventing spatial modulation of the electron beam or for permitting the beam to impinge on the mirror surface.

By adjusting the mirror bias so the mirrored electrons do not touch the surface 2, a non-destructive study of the surface is possible. This feature of electron mirror action and the fact that the electrons have typically only a few electron volts of energy at the point of turnaround causes them to be very sensitive to the variations in the electric, magnetic and topographic properties of the mirror surface, thus making electron mirrors useful as memory devices.

Efforts have been made to provide useful information storage and retrieval systems using electron mirror techniques. In U.S. Pat. No. 3,278,679 (Newberry) an electric charge pattern on a recording surface is read out by scanning the recording surface with a finely focused electron beam in time sequence and in accordance with a predetermined pattern. The beam is mirrored and is modified in accordance with the charge variations on the recording surface at the point where it is mirrored. The mirrored beam is directed to an image plane where it is converted to a time varying electric output signal which is representative of the potential variations detected at the storage surface. This system, of course, provides a relatively slow readout rate since it is a scanning system and thus reads out the information in a bit by bit fashion. A different charge pattern is presented by physically removing the record member and substituting a new record member. The need to physically introduce a second storage surface and the slow bit by bit readout of the data severely limits the practical application of the system.

U.S. Pat. No. 3,176,278 (Mayer) discloses an electron beam information storage and retrieval system which requires the use of a finely focused electron beam to record information at a storage surface. The Mayer apparatus does not detect the recorded information at the storage mirror on a bit by bit basis as is done by the Newberry apparatus, but focuses the electron beam during the read mode to encompass all the recorded information at the storage surface. The beam is spatially modulated in accordance with the stored information. This represents an improvement over the use of a finely focused beam during the read mode as employed by Newberry which requires the beam to be deflected very precisely in order to access the stored information without error. Though the Mayer apparatus provides this improvement, it still requires the readout beam to be scanned so the information contained in the modulated readout beam is presented to a detector on a bit by bit basis.

A co-pending application Ser. No. 119,630, filed Mar. 1, 1971, assigned to the Minnesota Mining and Manufacturing Company, now U.S. Pat. No. 3,723,978 discloses an improvement over the Mayer apparatus in that a beam addressable memory apparatus is provided wherein the modulated beam is directed to a detector which responds to the entire modulated beam to simultaneously produce electrical signals corresponding to the information bits contained in the beam. This system does, however, use a finely focused electron beam to write the bits of information on a single storage surface.

The fact that the prior art systems use a finely focused beam severally limits the storage capacity of the systems. Other than physically replacing a storage surface with another storage surface, which is impractical, the prior art does not use more than one storage surface with a single electron beam source. A single storage surface used with a single electron beam is limited in physical size and therefore capacity. The size of the storage surface is limited by the degree to which a finely focused electron beam can be deflected and by the working distance from the deflection unit to the storage plane. Overly large deflection angles cause beam distortion or defocusing and overly long working distances cause an increase in the beam cross-section. The reduction of errors by the use of redundant storage using the prior art systems can only be implemented at the cost of using the limited storage capacity.

SUMMARY OF THE INVENTION

The present invention avoids the limitations of the above-discussed prior art, and provides an apparatus having a storage capacity which is many fold larger and permits information to be written and read out at much higher speed than is possible with the prior art systems. These improvements have been made possible by using a plurality of electron mirrors and a single electron beam source.

One electron mirror is a modulating mirror which receives the information to be stored. The modulating mirror has a charged pattern formed on it in accordance with plurality of bits of information to be stored. Using electron mirror techniques and control of the beam cross-section, all of the bits of information (a page of information) are simultaneously transferred to one of a larger number of small storage areas provided at a storage electron mirror. By adding further storage mirrors, each having a plurality of storage areas, the storage capacity is correspondingly increased. In a manner similar to the write mode, a page of information at any of the storage mirrors is read out in parallel. Redundant storage is readily accomplished by storing a page of information at two storage areas from which the information is compared on readout. Preferably this redundant storage is at corresponding storage areas on different storage mirrors since the control signals needed to address the storage areas can be the same for each storage mirror.

Even though a large number of pages of information are stored, the apparatus permits the pages to be electronically accessed at random without any mechanical movement of the information prior to readout as is required in prior art systems of comparably large storage capacity such as magnetic tape, disc pack and drum storage systems.

Briefly, a page of input information to be stored is presented as a pattern of charge on the modulating mirror surface. An array of light sources, one for each bit of information in the page, reducing lenses and an array of photodiodes may be used to produce the pattern of charge. The light from the light sources is applied via the reducing lenses so the light from a given source is applied to a corresponding photodiode of the photodiode array to cause a pattern of charge to be at the mirror surface in accordance with the input information.

A write mode of operation is used when it is desired that the page of information presented at the modulating mirror surface be transferred for storage at one of the storage areas provided at a storage mirror. An electron beam is directed by a magnetic prism to the modulating mirror where it is mirrored and spatially modulated by the pattern of charge present at the mirror surface. Prior to reaching the modulating mirror, the electron beam passes through an electron focusing lens causing the cross-section of the beam to be increased so that the pattern of charge for the entire page of information at the modulating mirror modulates the electron beam. Upon being mirrored and modulated, the beam is then directed by the magnetic prism to a storage mirror. An electron focusing lens, deflection plates and an objective immersion lens serve to collimate the beam, reduce its cross-section and direct it to a selected one of the plurality of storage areas at said storage mirror. According to the mirror bias, the beam is passively mirrored or permitted to impinge on said storage mirror to cause the information to be stored as a pattern of charge at said storage mirror. In a system employing two mirrors, the modulated beam may be passively mirrored by the first storage mirror and then directed to a selected one of the storage areas at the second storage mirror where it is stored as a pattern of charge. It is also possible, by applying the appropriate bias to the storage mirrors, to have the beam passively mirrored at each storage mirror and then be directed to a readout array without being stored at a storage mirror.

During the read mode of operation, the page of information stored at any of the plurality of storage areas provided on the storage mirrors is transferred to a readout array for subsequent processing. This is accomplished by mirroring an electron beam without modulation at each mirror except at the storage mirror having the information storage area to be read. Prior to reaching the readout array for detection of the information contained in the modulated beam, the beam has its cross-section increased by an electron focusing lens.

The various lenses for focusing the beam as required for each of the mirrors and the readout array are contained in a three concentric ring lens structure which greatly simplifies the design and mounting of the focusing lenses used in the system.

BRIEF DESCRIPTION OF THE DRAWING

The invention will be understood and its various advantages will become apparent from the description to follow given in conjunction with the accompanying drawings wherein.

DESCRIPTION

Figure 2:
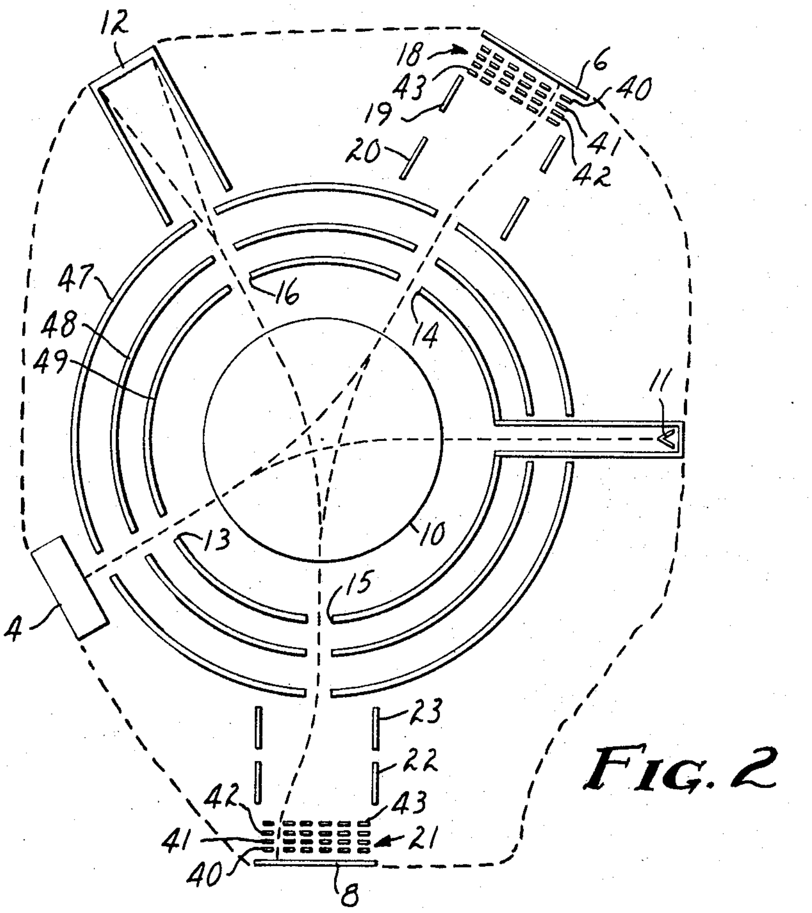
FIG. 2 is a schematic of an information storage and retrieval system embodying the invention.

The invention presented herein is embodied in the multiple electron mirror apparatus schematically shown in FIG. 2. Spaced about a magnetic prism 10 are a modulating electron mirror 4, two storage mirrors 6 and 8, an electron gun 11 and a readout array 12. Three element electron focusing lenses 13, 14, 15 and 16 provided for mirrors 4, 6 and 8 and the readout array 12, respectively, are also positioned around the prism 10. In addition to the focusing lens 14, the mirror 6 has an objective lens 18 positioned near its storage surface and two deflection units 19 and 20 positioned between the objective lens 18 and the intermediate lens 14. An objective lens 21 and two deflection units 22 and 23 are similarly provided for mirror 8. The objective lenses 18 and 21 may be three-element multi-apertured immersion type lenses. The components described in connection with FIG. 2 are secured within a housing represented by the dotted line surrounding the components to permit operation of the components at a pressure of approximately $10^{-8}$ Torr. For the sake of brevity and clarity, electrical connections have not been shown in FIG. 2. The various voltages required at the elements will be discussed in detail.

Before considering details regarding the various components and biasing voltages required, a general description will be given of the operation of the apparatus. The apparatus has a write mode and a read mode of operation. The write mode provides for the transfer of an entire page (plurality of bits) of information from mirror 4 to either of mirrors 6 and 8. This write mode can be referred to as a parallel write mode since all bits of information in the page are transferred simultaneously. A page of information is presented at the surface of the modulating mirror 4 in the form of a pattern of charge determined by the information bits. Each page of information transferred can be stored at a different one of a plurality of storage areas at the mirror surface of mirrors 6 and 8 or can be applied to a readout array 12. In addition, a transfer made to mirror 6 can be repeated at mirror 8 to provide redundant storage to improve reliability of the system. The read mode of operation provides for the transfer of the entire page of information present at a selected storage area of mirrors 6 and 8 to readout array 12. This read mode can be called a parallel read mode since all bits of information in the page are transferred simultaneously. The read mode of operation provides for random access to the stored information in that the electron beam is controlled by the voltages applied to the deflection units 19, 20 and 22, 23 for address of any storage area desired to be read.

During the write mode, a well collimated electron beam generated by the electron gun 11 is accelerated and directed at the center of the magnetic prism 10 which deflects the beam so as to pass through the intermediate lens 13 for modulating mirror 4. In the embodiment shown in FIG. 2, the beam is deflected 30°. The focusing lens 13 is constructed with focusing properties to cause the electron beam to present a cross-section large enough to encompass all of the modulation sites making up the page of information at the surface of the mirror 4. During the write mode the pattern of charge presented by the modulation sites on the surface of the mirror 4 spatially modulates the mirrored electron beam into a data or information pattern corresponding to the pattern of charge presented by the modulation sites.

After being mirrored and modulated at the modulating mirror 4, the electron beam passes back through the focusing lens 13 to the magnetic prism 10 where it is again deflected 30 degrees by the prism 10 for passage through the focusing lens 14 for the mirror 6. The lens 14 has focusing properties causing the beam to be collimated and reduced in cross-section. The beam then passes through the two deflection units 19 and 20 which serve to shape the beam and direct it to the desired location or address in the multi-apertured immersion objective lens 18. Assuming the information contained in the modulated electron beam is to be stored at mirror 6, the bias on mirror 6 is set to allow the beam to impinge on the addressed storage area on the surface of mirror 6 to deposit a pattern of charge corresponding to the beam modulation pattern. If the information is to be stored at mirror 8 instead of mirror 6, the bias on mirror 6 is set so the electron beam is passively mirrored without any spatial modulation by mirror 6. The beam passes back through the objective lens 18, the deflection units 19 and 20 and the focusing lens 14 to the magnetic prism 10 where it is again deflected 30° by the prism 10 for passage through the focusing lens 15 for mirror 8. The beam then passes through the two deflection units 22 and 23 where it is directed to the desired location or address in the multi-apertured immersion objective lens 21. Since the information contained in the modulated beam is to be stored at mirror 8, the bias on mirror 8 is set to allow the beam to impinge on the addressed storage area on surface of mirror 8 to create a pattern of charge corresponding to the beam modulation pattern. For redundancy purposes, the page of information presented at the modulation mirror 4 can be stored at mirrors 6 and 8. It is then possible during the read mode to read a selected page of information from each of the storage mirrors and present it to the readout array 12 to permit a comparison to be made of the information bits obtained from each page of information.

The information contained in the modulated beam can, if desired, be passively mirrored by each of the mirrors 6 and 8 and applied via the focusing lens 16 to the readout array 12. The focusing lens 16 has focusing properties causing the cross-section of the beam to be increased so that the spacing between the modulation sites within the modulated electron beam match the spacing between the elements of the readout array 12. The readout array 12 simultaneously senses the electrons in the beam representative all information sites contained in the modulated beam.

When retrieval or reading of the stored information is desired, the modulating mirror 4 does not modulate the electron beam, but simply serves as a passive element to maintain the beam path by merely mirroring the beam for passage to mirror 6. The deflection units 19 and 20, in accordance with the voltages applied to units 19 and 20, direct the beam to the desired location or address in the multi-apertured lens 18. Assuming the page of information at the addressed storage area of mirror 6 is to be read or retrieved, the mirror 6 is biased so the beam is spatially modulated by the stored charge pattern at the addressed storage area and mirrored for travel to mirror 8. The beam is directed by the deflection units 22 and 23 to the addressed location in the multi-apertured lens 21 and is passively mirrored by mirror 8. The beam is then presented to sensing units of the readout array 12 to provide simultaneous readout of all information sites contained in the modulated beam.

In the event the information to be retrieved is located at a storage area of mirror 8, the electron beam is passively mirrored by the electron mirror 6 and then modulated by the pattern of charge at the addresed area of mirror 8 prior to being presented to the readout array 12.

APPARATUS DETAILS

Since the various components have only been described in general terms in the foregoing description of the operation of the sytem, the various components and their operation will be treated in greater detail.

The electron gun 11 must be capable of producing a well collimated mono-energetic electron beam having a total current of at least one microamp. A beam having an energy spread of less than one electron volt (ev) is required to maintain acceptable image contrast and resolution. A pointed thermal cathode in a triode electron gun, such as the type used in electron microscopes, can be used for the electron gun 11.

Figure 1:
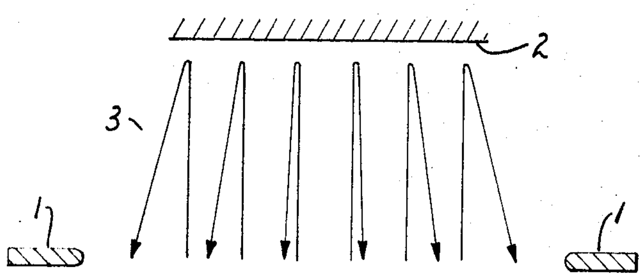
FIG. 1 is a schematic of the operation of an electron mirror.
Figure 3:
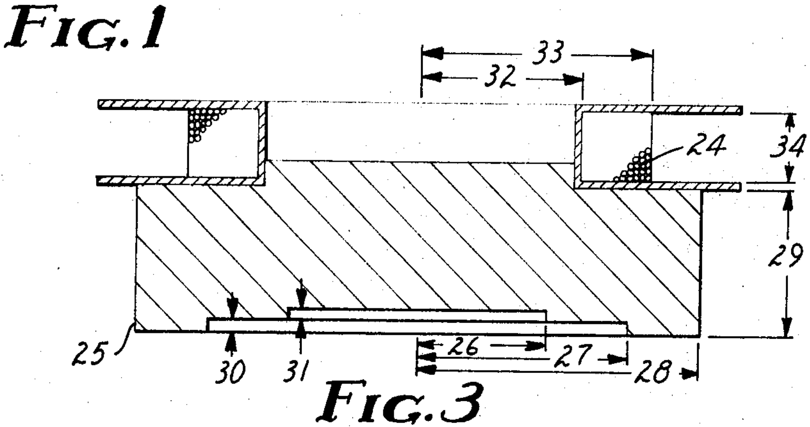
FIG. 3 is a section of the one coil and pole piece for a set of Helmholtz coils used in the system of FIG. 2.

The magnetic prism 10 only serves to direct the beam from one intermediate electron focusing lens to another making it possible to form the prism with a set of Helmholtz coils. In order that deflection distortion can be minimized, the coils should be fitted with pole pieces of appropriate shape to shape the field distribution. FIG. 3 is a sectional view of one coil or winding 24 and a suitable pole piece 25 with certain dimensions identified. Specifications for constructing a suitable magnetic prism for providing 30° deflection of the electron beam as used in the system shown in FIG. 2 are set forth below with reference numerals provided on FIG. 3 corresponding to those set forth below.
The dimensions are in inches.

Polepiece Radius 26 0.750
Polepiece Radius 27 1.250
Polepiece Radius 28 1.750
Polepiece Width 29 0.875
Polepiece Steps 30 and 31 0.060
Windings Radius 32 1.063
Windings Radius 33 1.360
Windings Width 34 0.375
No. of Poles 2
Pole Gap 0.500
Excitation 280 ampere-turns in each coil
Deflection Angle For 6.0 KeV electron beam 30°

As has been indicated, the modulating mirror 4 provides a pattern of charge at its surface in accordance with information supplied from an external source with the pattern of charge so formed spatially modulating the electron beam when mirror 4 is biased for modulation. Photodiode arrays, such as those used for vidicon targets, can be used to generate pattern of charge needed to modulate the electron beam. Each diode in the array provides a modulation site. Using commercially available diode arrays, the density of such sites can as high as $3.2 \times 10^5/cm^2$. Using a diode array, two steps are needed to generate the pattern of charge for modulating the beam. FirSt, the diode array should be charged uniformly. This is accomplished by biasing the mirror 4 to allow the electron beam to momentarily strike the mirror surface uniformily. Second, a light optical image is focused on the array. Photoconduction discharges the illuminated areas of the array creating a pattern of charge corresponding to the light optical image.

The light optical image can, for example, represent binary information. Conversion of incoming binary information from an external source to a binary light pattern which can be focused on the diode array is readily achieved by applying the incoming binary information to a plasma display panel or an array of small lights such as light emitting diodes. A plasma display panel is made up of an array of small individually addressable neon lights.

Figures 4, 5:
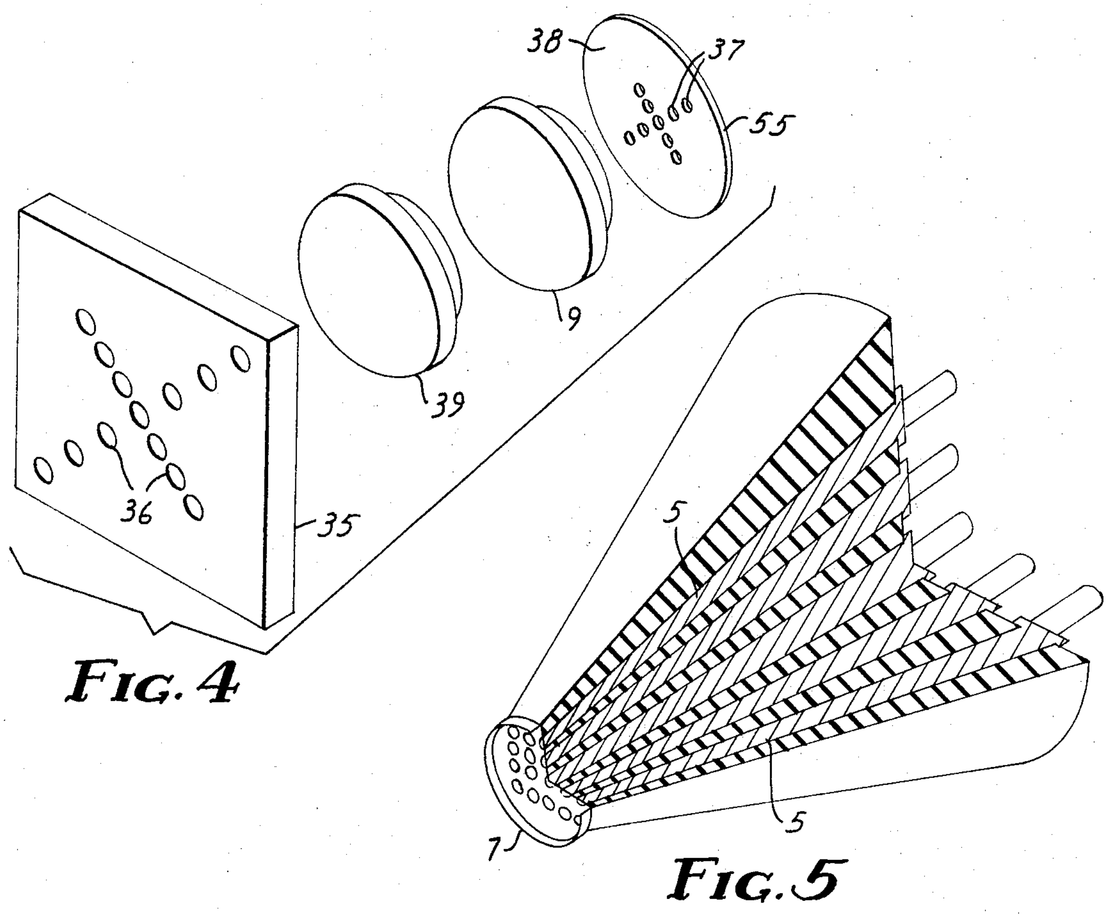
FIG. 4 is a schematic of a preferred form of a modulating mirror for use in the system of FIG. 2.
FIG. 5 is a schematic showing of another preferred embodiment of a modulating mirror for use in the system of FIG. 2.

FIG. 4 is a schematic showing of a modulating mirror 4 which includes a light optical image means 35, lenses 39, 9 and a photodiode array 38. The light optical image means 35 is illustrated with only a few of the possible light sources 36 shown. The light from the light sources 36 is focused onto individual diodes 37 in the photodiode array 38 via the lenses 39 and 9 which also provide optical reduction of the light optical image. The optical reduction is needed since the density of light sources 36 is typically 1.7 to $6.8 \times 10^2/cm^2$ which is less than the density of the diodes 37. The electron beam side of the photo-diode array 38 for the modulating mirror 4 is indicated at 55.

An alternate structure for the modulating mirror 4 is shown in FIG. 5. A plurality of fine wires or tapered conducting fibers 5 are held in a close packed array by an insulating matrix 7, the surface of which is covered with a high resistivity coating. The pattern of charge needed at the modulating mirror 4 to modulate the electron beam are produced by applying a suitable voltage between the individual wires 5 and the resistive coating on the matrix 7. Binary information may be applied to the modulating mirror 4 for transfer to the electron beam by applying a voltage between an individual wire and the resistive coating to indicate a one and by not applying a voltage betwen an individual wire and the resistive coating to indicate a zero. The page size or total number of bits that can be written simultaneously is determined by the number of wires in the bundle and the cross-sectional area of the electron beam at the modulating mirror. For example, if the beam area near the modulating mirror is $1.6 \times 10^{-2}$cm.$^2$ and the density of wires is $4 \times 10^4$/cm.$^2$, the page size would be 640 bits. This is much smaller than is possible using the structure per FIG. 4. The page size that is possible using the modulating mirror structure shown in FIG. 4 is approximately 5,000 bits.

Figure 6:
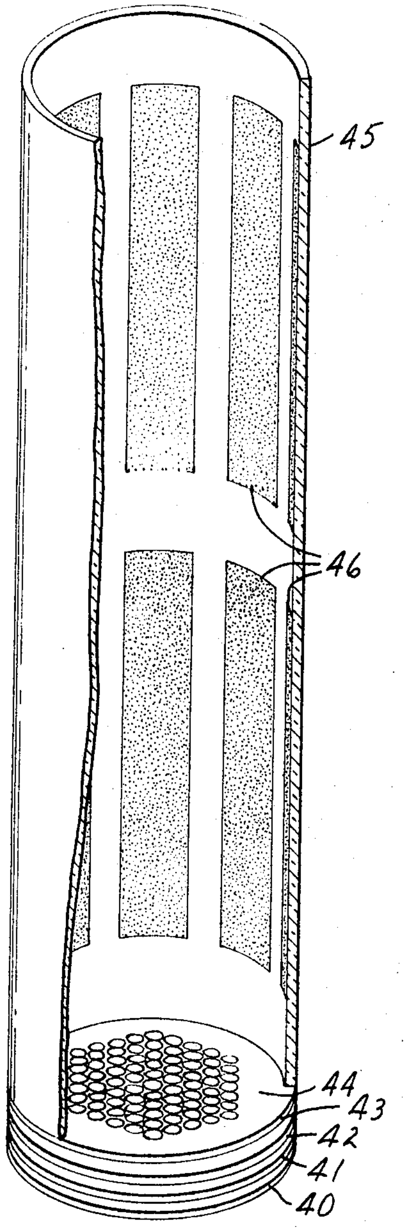
FIG. 6 is a schematic showing of the multi-apertured objective lenses and associated sets of deflection plates used in the system of FIG. 2.

The multi-aperture immersion objective lenses 18 and 21 are used in directing the electron beam to a plurality of storage areas of the storage surface of mirrors 6 and 8, respectively. FIG. 6 shows a suitable construction for the objective lenses 18 and 21. The lens includes three plates 40–42 having an identical array of holes 44. The plates 40–42 are mounted parallel to one another with the holes or apertures 44 in each of the plates coaxially aligned. The storage area beneath each set of apertures corresponds to the address or location of a page of information to be stored. Biasing of the plates 40–42 relative to one another controls the cross-section of the electron beam at the storage surface and therefore the density of written or recorded information. The plates 40–42 for the lenses 18 and 21 are spaced from one another and positioned at one end of a tubular sleeve 45 of non-conducting material such as glass with a fourth plate 43 having the same pattern configuration as the plates 40–42 positioned between the plates 40–42 and the tubular sleeve 45. Plate 43 serves to physically remove stray electrons from the beam prior to reaching the plates 40–42. No voltage is applied to plate 43.

The multi-aperture immersion lenses 18 and 21 as shown in FIG. 6 provide access to various storage areas while maintaining the strong electric field needed for high resolution electron mirror imaging. The structure also makes it possible to use a well collimated beam in the deflection region resulting in reduced distortion for a given deflection angle. In addition, the lens structure further reduces distortion since the beam passes through the plates parallel to the axis of the lens.

Details regarding the structure for plates 40–43 which provide suitable lenses 18 and 21 are as follows:

Pattern for apertures 44 is hexagonal with holes on 0.090 inch centers
Apertures 44 for plates 40–42 are 0.0625 inches
Apertures 44 for plate 43 are 0.032 inches
Plates 40–42 are 0.032 inches thick
Plate 43 is 0.030 inches thick
Distance from the storage surface of the mirror:
Plate 40 0.125 inches
Plate 41 0.220 inches
Plate 42 0.314 inches
Plate 43 0.466 inches The tubular glass sleeve 45 also provides a convenient way for forming and locating the two deflection units 19, 20 and 22, 23 used with mirrors 6 and 8, respectively. Each deflection unit includes eight evenly spaced electrostatic deflection plates 46 formed by selectively coating the inner surface of the sleeve 45 with graphite at the areas needed to define each deflection plate. The first set of plates act on the electron beam to deflect it to the desired location while the second set of plates corrects the beam direction so that the beam passes into the multi-aperture immersion lens at the other end of sleeve 45 parallel to the axis of the addressed apertures 44. Since eight plates are used for each deflection unit, better control of the cross sectional shape of the electron beam is possible.

Suitable deflector units can be constructed using a one inch (inside diameter) glass tube or cylinder for the sleeve 45. Each unit has eight evenly spaced plates two inches long. The units are spaced 0.5 inches apart. One unit is 0.25 inches from the prism 10 end of the sleeve 45 and the other set is 0.25 inches from the plate 43. Electrical connections are made to the plates via holes (not shown) in the sleeve 45 so that the desired deflection voltages for address of a selected storage site can be applied.

It is desirable that the storage surface provided at each of the mirrors 4 and 7 be capable of storing information for at least 24 hours and allow the information to be updated by erasing and rewriting when required. A dielectric thin film on a conducting substrate such as a silicon wafer will meet these requirements. The dielectric film may be such materials as bismuth titanate, aluminum oxide or silicon dioxide. The thickness of the dielectric storage film should be small compared to the spacing of the information bits and remain large enough to allow rapid writing. The first condition minimizes lateral migration of charge while the second minimizes both the charge needed to create a readable pattern and the capacitive loading of the electronic pulsing circuitry required for use with the system.

A pattern of positive charge is established or written at a storage area when the modulated electron beam strikes the storage area with approximately 100 eV of energy. Erasure of the stored information can be accomplished by allowing a beam which has been modulated at all information sites to strike the storage area to be erased with energy of approximately 5–10 eV for a suitable length of time. With the energy level at 5–10 eV, the previous pattern of charge is eliminated by the build up of a negative charge pattern at the storage area.

As has been mentioned, the focusing lenses 13–16 must have different focusing properties. As shown in FIG. 2, each of the focusing lenses 13–16 has three elements. The focusing properties of each focusing lens is determined by the size of the hole for each of the elements, the voltage difference between the elements and the spacing between the various elements. With three variables, it is apparent that any number of intermediate lenses can be designed to provide the desired focusing property for various intermediate lenses.

Figure 7:
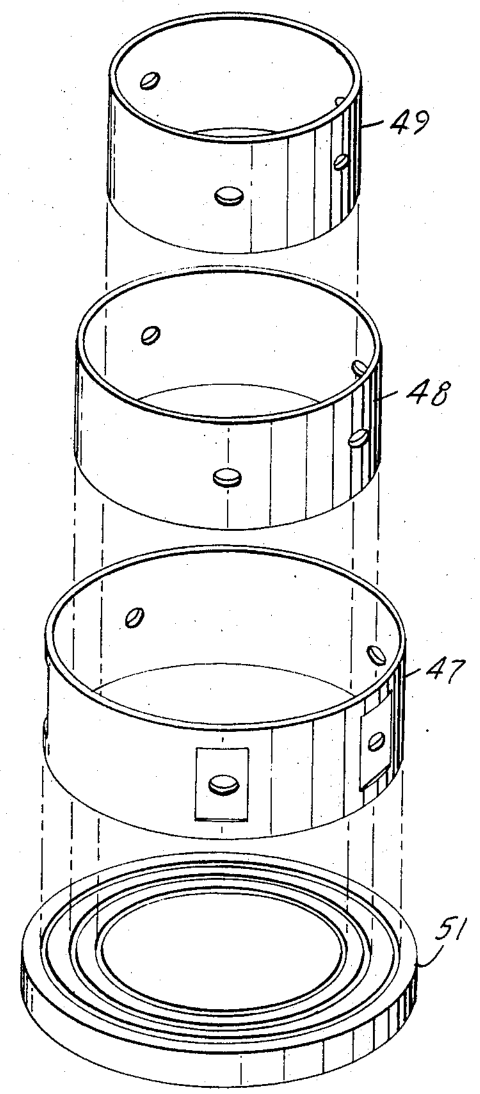
FIG. 7 is an exploded view of a concentric ring lens embodying the electron focusing lenses used in the system of FIG. 2.

The three concentric outer rings 47–49 shown in FIG. 2 schematically represent a preferred structure which includes the intermediate lenses 13–16. This structure is shown in greater detail in FIG. 7 and includes a set of three concentric metal rings 47–49 having a set of radially aligned holes at each of the intermediate lens locations. Such an electrostatic ring lens assembly greatly simplifies the construction of a rather complex electron optical system. As can be seen in FIG. 2, the spacing between the rings is the same. The voltage difference between the rings for each focusing lens 13–16 is kept the same so the different focusing properties required for lens 13–16 are obtained by varying the size of the hole in the inner, middle and outer rings for each of the focusing lens. The difference in the size of the holes is not shown in FIG. 2. FIG. 7 provides an exploded view of the rings lens assembly, which includes an outer ring 47, a center or intermediate ring 48 and an inner ring 49. The area surrounding various holes is highly polished and the edges rounded off in the usual manner. In addition, at least the outer surface of the outer ring 47 surrounding the hole for the focusing lenses 13 for mirror 4 is ground flat so the lens surface will be parallel to the mirror 4 surface. The flat area is needed because of the strong field that is presented between the mirror and the outer ring 47. The ring lens type construction, in addition to making it possible to provide a number of lenses of different focal lengths from three appropriately machined rings, greatly simplifies the problem of orientation of one lens relative to another and its circular symmetry makes mounting simple and mechanically stable. As shown in FIG. 7, the three rings are mounted on a nonconductive base 51 in which grooves are formed for receiving the three rings. The dimensions in inches for a suitable ring lens construction of the type described are set forth below:

| | Ring **47** | Ring **48** | Ring **49** |
|---|---|---|---|
| Inside Diameter | 7.540 | 6.540 | 5.540 |
| Thickness | 0.210 | 0.210 | 0.210 |
| Outside Diameter | 7.960 | 5.960 | 6.960 |
| Aperture Bores | | | |
| Lens **13** | 0.125 | 0.875 | 0.375 |
| Lens **14** and **15** | 0.125 | 0.500 | 0.375 |
| Lens **16** | 0.375 | 0.375 | 0.375 |

The function of the readout array 12 is to sense simultaneously the electrons in the beam representative of all information sites which make up the page of information within the modulated beam cross-section. An array of sensors which measure the electron current of each location can be used and a number of different types of sensors are suitable for such use. Diodes are preferred and are arranged in a matrix (not shown) to match the beam information sites. A diode when exposed to electron bombardment will give a current signal gain of 1,000 or more if it is biased so that the depletion region substantially overlaps the penetration region of the electrons. This current can, of course, be amplified to bring the signal to the standard logic signal level. All diode anodes in a given row of the matrix are connected together and all diode cathodes in a given column are connected together making it possible to address any given diode in the array for readout by selecting the appropriate row and column connections. The page of information detected by the sensor array can then be easily read, converted to a suitable digital form and broken into words of suitable length for transmission to the central processing unit of a computer.

In addition to the specifications that have been given for the various components, the following specifications are applicable to a suitable structure as shown in FIG. 2 utilizing the various components that have been described. Thus, the plate 43 which precedes the plates 40–42 for the multi-aperture immersion objective lenses 18 and 21 is located 5 inches from the outer ring 47 of the ring lens and is 8.98 inches away from the center of the magnetic prism 10. The modulating surface for modulating mirror 4 is 0.375 inches from the flat surface presented at the outer ring 47 of the ring lens assembly. The detector plane of the readout array 12 is 10.5 inches from the outer ring 47 of the ring lens and is 14.48 inches from the center of the magnetic prism 10. The cathode tip of the electron gun 11 is located 8.125 inches from the outer ring 47 and is 12.105 inches from the center of the magnetic prism 10.

OPERATING VOLTAGES

Voltages for the various elements are set forth below. The voltages are given in terms of the ratio of the voltage at a particular element to the maximum applied voltage.

| Element | Voltage Ratio |
|---|---|
| Electron Gun 11 | |
| Cathode | 0.000 |
| Anode | 0.600 |
| Ring Lens | |
| Inner Ring Lens 49 | 0.600 |
| Center Ring Lens 48 | 0.132 |
| Outer Ring Lens 47 | 1.000 |
| Objective Lenses 18 and 21 | |
| Plate 42 | 1.000 |
| Plate 41 | 0.420 |
| Plate 40 | 1.000 |
| Deflection Units 19, 20 and 22, 23 | 1.000 + Deflection Voltage |

As indicated in connection with the general description regarding the operation of electron mirrors, it is apparent that the voltages presented at the modulating mirror 4 and storage mirrors 6 and 8 determine whether the electron beam will be modulated and mirrored, whether it will impinge on the surface of the mirror or be passively mirrored as is required for the write, read and erase operations that have been described.

Figure 8:
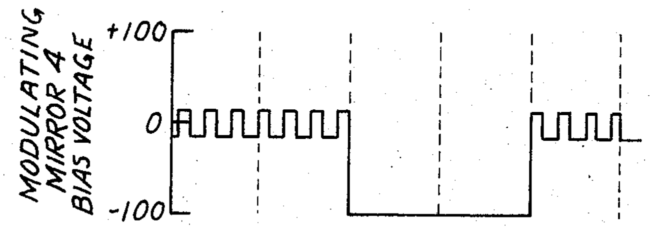
FIGS. 8, 9 and 10 are plots of the bias voltages versus time applied to the modulating mirror and storage mirrors for the system shown in FIG. 2 for operation of the system in the read, write modes and for erasure of information stored at a storage mirror of the system.
Figure 9:
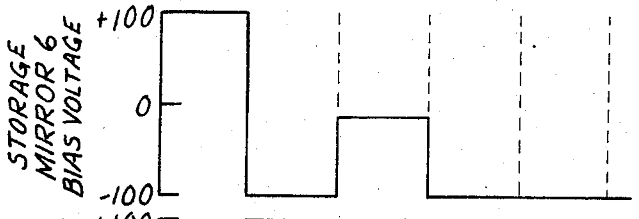
Figure 10:
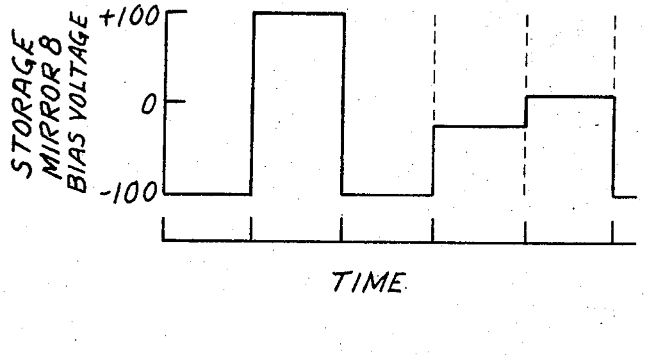

FIGS. 8 through 10 show the voltages with respect to time that are applied to a number of the components for the write, read and erase operations. FIG. 8 shows the modulating mirror bias, while FIGS. 9 and 10 show the voltages for the storage surfaces for mirrors 6 and 8 respectively.

It was indicated in connection with the description of the modulating mirror 4 (FIG. 4) that the generation of a pattern of charge at the modulating mirror 4 can be achieved by uniform charging of the diode array 38 and then focusing the light optical image on the diode array 38. This modulation process is best carried out as illustrated in FIG. 8. As shown in FIG. 8, a series of slightly negative and positive voltage pulses are applied to the modulating mirror 4 when the system is in the write mode of operation. The light optical image is applied to the diode array 38 for mirror 4 as the voltage pulses per FIG. 8 are applied to the surface of mirror 4. The pattern of charge is transformed into an electron mirror image during each of the negative voltage pulses. The positive voltage pulses provide the uniform charging of the diode array 38 of mirror 4. The time required for transforming the information at mirror 4 to a charge pattern at one of the storage mirrors 6 and 8 can be as short as 1 to 10 micro-seconds.

At the same time as the mirror 4 is biased for modulation of the electron beam, the desired storage area on the storage surface of mirror 6 is established by applying the necessary deflection voltages to the deflection units 19 and 20. The beam passes through the addressed aperture of the multi-apertured lens 18 and creates a pattern of charge at the desired storage site which is determined by the modulation pattern of the beam. At this time, bias at the storage surface of mirror 6 with relation to the cathode of electron source 11 is about 100 volts positive as shown in FIG. 9.

Since mirror 8 provides a second storage surface, it is possible, as has been mentioned, to store the same information as was stored at mirror 6 at mirror 8. This is the type of operation that is indicated by the voltages plotted in FIGS. 8–11. Thus, if redundant storage is used, the information on the modulating mirror 14 is retained, the deflection voltages applied to the deflection units 19 and 20 are also applied to the deflection units 22 and 23 for mirror 8 and a negative bias of approximately 100 volts is applied to the storage surface of mirror 6 while the bias at the storage surface of mirror 8 is about 100 volts positive. Under these conditions, the information is impressed on the beam of the modulating mirror 4 and is directed to mirror 6 where the beam is passively mirrored and then directed to the selected storage area of storage mirror 8 causing the same pattern of charge that was created at mirror 6 to be created on the storage surface for mirror 8. This redundant storage, of course, improves the reliability of the system since the same information is presented at two storage areas. While the operation has been described showing the information to be stored at mirror 6 and then at mirror 8, it should be understood that the information could be first stored at mirror 8 and then at mirror 6.

The read mode of operation is accomplished by applying a negative bias of five volts to the storage surface to be read with a strong negative bias of 100 volts being applied to the modulating mirror 4 and the remaining storage mirror. The necessary deflection voltage corresponding to the storage area to be read is applied to the deflection units for the storage mirror. The pattern of charge at the storage area of the storage mirror being read is transformed to an electron mirror image by modulation of the electron beam presented to it and is transferred to the readout array 12 where the electrons in the beam representative of all the modulation sites in the image are detected simultaneously. FIGS. 8–11 show this operation being carried out for storage mirror 6 and then storage mirror 8. Such procedure would be followed when information is stored redundantly. Thus, after reading a storage area or page of information from one of the storage surfaces, the corresponding storage area or page on the second storage surface is read and the output obtained from the readout array 12 compared for errors.

Before information stored at a storage area at a given storage mirror can be updated, it is necessary to first erase the information present at such storage site and then write the new information. It has been found that erasure is best accomplished by first illuminating all of the photodiodes 37 for the modulating mirror 4 via the light sources 36. The electron beam is modulated at the mirror 4 and presented to the storage area to be erased. For erasure, the voltage conditions are set as required for normal writing except that the storage surface at which the storage area is to be erased is biased positive at a level of 5 to 10 volts. Thus, FIGS. 8–11 show the voltage conditions applied to erase a storage area or page at the storage surface of mirror 8. The positive bias on the storage surface where erasure is to occur causes the beam which has been modulated at mirror 4 to eliminate the pattern of charge at the storage area representing a page of information by the build up of a negative charge pattern at the storage area.

SECOND EMBODIMENT

Figure 11:
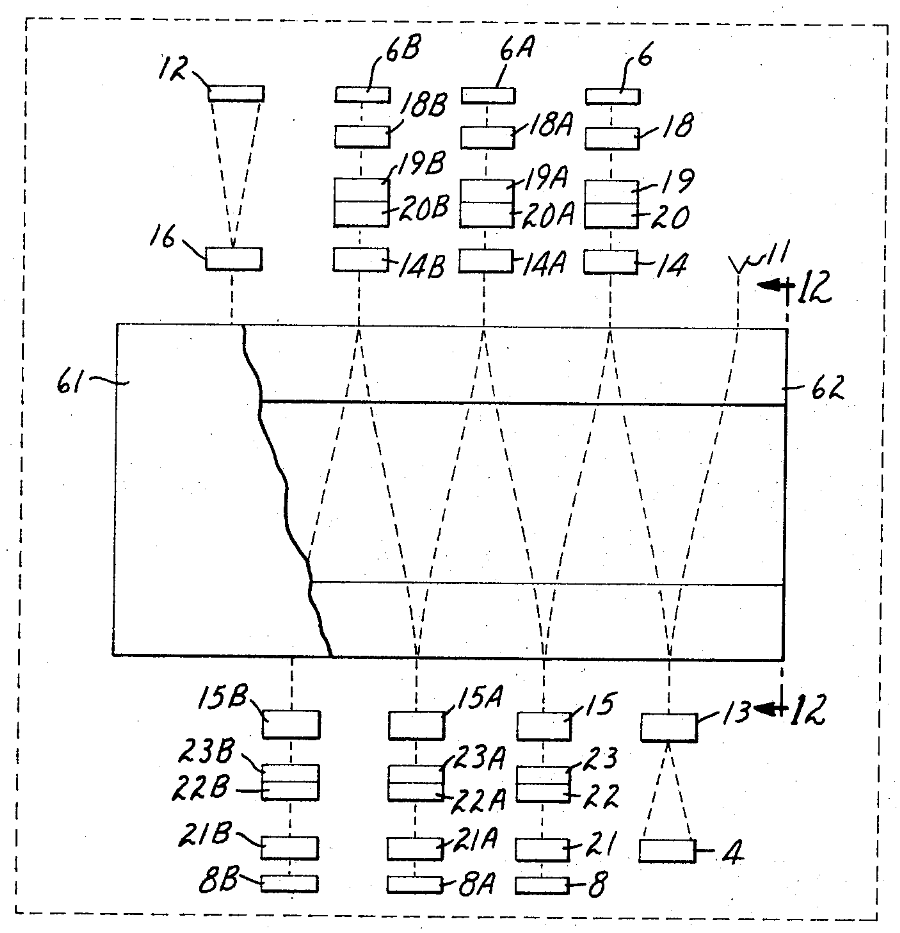
FIG. 11 is a schematic of another information storage and retrieval apparatus embodying the invention.
Figure 12:
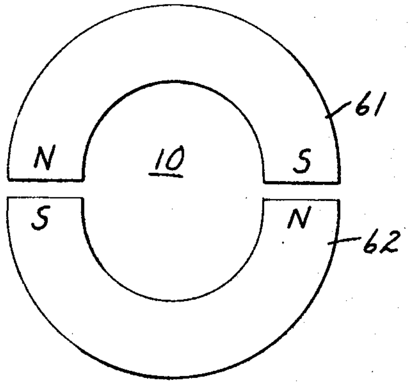
FIG. 12 is an end view of the magnetic prism 10 used in the embodiment shown in FIG. 11 and is taken along 12—12 of that figure.

FIG. 11 is another embodiment of the invention and differs from that shown in FIG. 2 in that a different magnetic prism 10 is used. The prism 10 used in the embodient of FIG. 11 is formed using two U-shaped type magnets 61 and 62 which can be of the permanent or electromagnetic type. FIG. 12 is an end view of the prism 10 taken along 12—12 of FIG. 11. The magnetic polarity shown is that which is required to have the electron beam deflected as indicated by the dotted line path which begins at the electron beam source 11.

The reference numerals used in FIG. 2 to identify the various components in that embodiment are applied, where applicable, to corresponding components used in the apparatus of FIG. 11. It will be noted, however, that the embodiment of FIG. 11 shows the use of more than two storage mirrors 6 and 8. The additional storage mirrors and their associated deflection units, objective lenses and electron focusing lenses are identified by the addition of a letter to the basic reference numeral. Thus, the additional storage mirrors positioned on the same side of the prism 10 as storage mirror 6 are identified with reference 6A and 6B. The objective lens for storage mirror 6A is identified by the reference numeral 18A, while numerals 19A and 20A designate the deflection units for storage mirror 6A. The electron beam focusing lens for storage mirror 6A is identified by the reference 14A. Similar designations are made for storage mirror 6B. In a similar manner, the additional storage mirrors positioned on the same side of the prism 10 as storage mirror 8 are identified by references 8A and 8B. References 15A, 21A, 22A and 23A identify the electron focusing lens, the objective lens and the two deflection units, respectively, which are used with the storage mirror 8A. The electron focusing lens, objective lens and two deflection units for the storage mirrors 8B are identified in a similar manner.

Operation of the embodiment of FIG. 11 is substantially the same as that set forth for the embodiment of FIG. 2 except for the number of storage mirrors used and the fact that the degree to which the electron beam is deflected by the prism 10 is substantially less than that required for the FIG. 2 structure. The linear configuration of the apparatus shown in FIG. 11 theoretically permits any number of electron mirrors to be used which is not the case for the circular configuration of FIG. 2.

Figure 13:
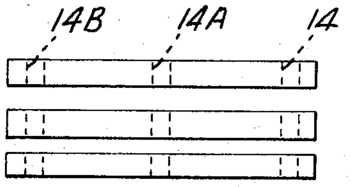
FIG. 13 is a top view of the preferred structure for the electron focusing lenses used in the apparatus of FIG. 11.

As has been mentioned, the electron focusing lenses 13, 14, 15 and 16 for the FIG. 2 embodiment are formed using three concentric rings with holes of appropriate size provided for passage of electron beam with the spacing between the rings, the size of the holes and the voltage applied to the three rings determining the focusing characteristic for the lenses. Three-element type focusing lenses can also be used for the structure per FIG. 11. the liner configuration, however, permits the use of straight elements rather than ring shaped which greatly simplifies the machining problem. FIG. 13 is a top view of a three-element arrangement for the focusing lenses 14, 14A and 14B for use in the FIG. 11 embodiment. A similar arrangement can be used to provide focusing lenses 15, 15A and 15B.

In the light of the above teachings, alternative arrangements and techniques embodying the invention will be suggested to those skilled in the art. The scope of protection afforded the invention is not intended to be limited to the specific embodiments disclosed, but is to be determined only in accordance with the appended claims.

What is claimed is:

1. An electron beam information storage and retrieval apparatus with a read mode and write mode of operation comprising:
   - an electrically biased modulating electron mirror biased during the read mode to passively mirror an electron beam and biased during the write mode to modulate and mirror an electron beam presented to any pattern of charge on the mirror;
   - an electrically biased storage electron mirror biased during the read mode to modulate and mirror an electron beam presented to any pattern of charge stored on the storage mirror and biased during the write mode to cause an electron beam to impinge to store a pattern of charge thereon;
   - means for applying information to the surface of said modulating mirror as a pattern of charge,
   - readout means;
   - means for providing an electron beam; and
   - means for sequentially presenting the electron beam to the modulating mirror, the storage mirror and the readout means during the read mode and to the modulating mirror and the storage mirror during the write mode.

2. An electron beam information storage and retrieval apparatus in accordance with claim 1 wherein said means for applying information to the surface of the modulating mirror includes a photodiode array and a plurality of light sources providing a light image in accordance with the information to be stored, said photodiode array positioned for responding to the light image received from said plurality of light sources to provide a pattern of charge at the surface of the modulating mirror.

3. An electron beam information storage and retrieval apparatus in accordance with claim 2 wherein said light sources are light emitting diodes.

4. An electron beam information storage and retrieval apparatus in accordance with claim 2 wherein said light sources are provided by a plasma display panel.

5. An electron beam information storage and retrieval apparatus in accordance with claim 1 wherein the pattern of charge at the surface of the modulating mirror represents a plurality of bits of information and the means presenting the electron beam to the modulating mirror includes an electron focusing lens for increasing the cross-section of the electron beam so the beam encompasses the pattern of charge.

6. An electron beam information storage and retrieval apparatus in accordance with claim 5 wherein the storage mirror has a plurality of storage areas and the means presenting the electron beam to the storage mirror includes an electron focusing lens for reducing the cross-section of the beam so the beam encompasses only a single one of the storage areas and deflection means for directing the electron beam to any one of the plurality of storage areas whereby random access to the storage areas is provided.

7. An electron beam information storage and retrieval apparatus in accordance with claim 6 wherein the deflection means includes two deflection units, each unit having a plurality of deflection plates.

8. An electron beam information storage and retrieval apparatus in accordance with claim 7 wherein each deflection unit has eight deflection plates.

9. An electron beam information storage and retrieval apparatus in accordance with claim 5 wherein the readout means includes a plurality of diodes, at least one diode for each bit of said plurality of bits of information.

10. An electron beam information storage and retrieval apparatus in accordance with claim 9 wherein the means for presenting the electron beam to the readout means includes an electron focusing lens for increasing the cross-section of the electron beam so the beam encompasses the plurality of diodes.

11. An electron beam information storage and retrieval apparatus in accordance with claim 6 wherein the means presenting the electron beam includes a multi-aperture immersion type objective lens positioned adjacent the storage electron mirror with an opening provided in the objective lens for each of the plurality of storage areas.

12. An electron beam information storage and retrieval apparatus in accordance with claim 11 wherein the objective lens includes three multi-apertured spaced plates, the apertures of which are coaxially aligned.

13. An electron beam information storage and retrieval apparatus in accordance with claim 12 wherein a plate similar to said three multi-apertured spaced plates is positioned between the deflection means and the three multi-apertured spaced plates to mechanically remove any electrons in a beam presented to it which may be outside the aperture to which the beam is directed.

14. An electron beam information storage and retrieval apparatus in accordance with claim 1 wherein the means presenting the beam includes a plurality of electron focusing lenses, each lens having a plurality of lens forming elements, each of the elements having an opening through which the electron beam passes with each element in one of the lenses physically and electrically connected to a corresponding element in each of the other lenses.

15. An electron beam information storage and retrieval apparatus in accordance with claim 14 wherein three concentric rings provide said lens forming elements for each of said plurality of focusing lenses.

16. An electron beam information storage and retrieval apparatus in accordance with claim 1 wherein the means sequentially presenting the electron beam includes a magnetic prism about which the means providing an electron beam, the modulating mirror, the storage mirror and read-out means are positioned.

17. An electron beam information storage and retrieval apparatus in accordance with claim 1 wherein the means sequentially presenting the beam includes a magnetic prism located centrally of the means providing an electron beam, the modulating mirror, the storage mirror and the readout array.

18. An electron beam information storage and retrieval apparatus with a read mode and write mode of operation comprising:

an electrically biased modulating electron mirror biased during the read mode to passively mirror an electron beam and biased during the write mode to modulate and mirror an electron beam presented by any pattern of charge stored on the mirror;

a plurality of electrically biased storage electron mirrors with any one storage mirror biased during the read mode to modulate and mirror an electron beam and any one storage mirror biased during the write mode to cause an electron beam to impinge and store a pattern of charge thereon, the remaining storage mirrors during the read and write mode biased to passively mirror an electron beam;

means for applying information to the surface of said modulating mirror as a pattern of charge, a readout means;

means providing an electron beam; and means for sequentially presenting the electron beam to the modulating mirror, the storage mirrors and the readout means during a read mode and to the modulating mirror and at least one of the storage mirrors during the write mode.

19. A method for storing information bits on an electron mirror comprising the steps of forming a pattern of charge on a first electron mirror representative of a plurality of bits of information;

electrically biasing the first electron mirror so an electron beam presented to it is mirrored and modulated by the pattern of charge on the first electron mirror;

presenting an electron beam to the first electron mirror to encompass the pattern of charge on the first electron mirror;

electrically biasing a second electron mirror to permit an electron beam presented to it to impinge thereon; and presenting the electron beam after it is mirrored and modulated by the electron mirror to the second electron mirror for impingement thereon to store a pattern of charge representative of the modulated electron beam.

20. A method as set forth in claim 19 wherein said step of presenting the electron beam to the second electron mirror includes the steps of reducing the cross-section of the electron beam and directing the electron beam to one of a plurality of storage areas on the second electron beam.

21. A method for storing information bits on a plurality of electron mirrors comprising the steps of forming a pattern of charge on a first electron mirror representative of a plurality of bits of information;

electrically biasing the first electron mirror so an electron beam presented to it is mirrored and modulated by the pattern of charge on the first electron mirror;

presenting an electron beam to the first electron mirror to encompass the pattern of charge on the first electron mirror;

electrically biasing all but one of the remaining ones of the plurality of electron mirrors to mirror an electron beam presented to it;

electrically biasing said one electron mirror to permit an electron beam presented to it to impinge thereon; and sequentially presenting an electron beam to the first electron mirror for modulation of the electron beam by the pattern of charge at the first electron mirror and then to said remaining electron mirrors until said one electron mirror is reached where the modulated electron beam impinges on said one electron mirror to store a pattern of charge representative of the modulated electron beam.

22. A method as set forth in claim 21 wherein the step of sequentially presenting an electron beam to said one electron mirror includes the steps of reducing the cross-section of the beam prior to impingement of the beam on said one electron mirror and presenting the electron beam to one of a plurality of storage areas on said one electron mirror for impingement thereon.

23. A method for storing information bits on an electron mirror and retrieving the stored information therefrom comprising the steps of forming a pattern of charge on a first electron mirror representative of a plurality of bits of information;

electrically biasing the first electron mirror so an electron beam presented to it is mirrored and modulated by said pattern of charge;

presenting an electron beam to the first electron mirror to encompass said pattern of charge;

electrically biasing a second electron mirror to permit an electron beam presented to it to impinge thereon;

presenting the electron beam after it is mirrored and modulated by the electron mirror to the second electron mirror for impingement thereon to store a pattern of charge representative of the modulated electron beam;

electrically biasing the first electron mirror so an electron beam presented to it is passively mirrored;

electrically biasing the second electron mirror so an electron beam presented to it is mirrored and modulated by the pattern of charge stored thereon;

presenting the electron beam to the first electron mirror and upon being passively mirrored thereby; presenting the electron beam to the second electron mirror for mirroring and modulation by the pattern of charge stored thereon; and presenting the electron beam upon being mirrored by the second electron mirror to a readout array for detection of the modulations contained in the beam which are representative of the information bits stored.

24. A method as set forth in claim 23 wherein each of said steps presenting the electron beam to the second electron mirror includes the steps of reducing the cross-section of the electron beam and directing the electron beam to one of a plurality of storage areas on the second electron beam.

25. A method for storing information bits on a plurality of electron mirrors and retrieving the stored information therefrom; comprising the steps of forming a pattern of charge on a first electron mirror representative of a plurality of bits of information;

electrically biasing the first electron mirror so an electron beam presented to it is mirrored and modulated by said pattern of charge;

electrically biasing all but one of the remaining ones of the plurality of electron mirrors to mirror an electron beam presented to it;

electrically biasing said one electron mirror to permit an electron beam presented to it to impinge thereon;

presenting an electron beam to the first electron mirror to encompass said pattern of charge;

sequentially presenting the electron beam to the first electron mirror for modulation of the electron beam by the pattern of charge at the first electron mirror and then to said remaining electron mirrors until said one electron mirror is reached where the modulated electron beam impinges on said one electron mirror to store a pattern of charge representative of the modulated electron beam;

electrically biasing the first electron mirror so an electron beam presented to it is passively mirrored;

electrically biasing said one electron mirror so an electron beam presented to it is mirrored and modulated by the pattern of charge stored thereon;

sequentially presenting the electron beam to the first electron mirror, then to said remaining electron mirrors including said one electron mirror where the electron beam is mirrored and modulation by the pattern of charge stored thereon; and presenting the electron beam upon being mirrored by the last of said remaining electron mirrors to a readout array for detection of the modulation contained in the electron beam which are representative of the information bits stored.

26. A method as set forth in claim 25 wherein each of said steps of sequentially presenting an electron beam to said one electron mirror includes the steps of reducing the cross-section of the beam prior to impingement of the beam on said one electron mirror and presenting the electron beam to one of a plurality of storage areas on said one electron mirror for impingement thereon.

* * * * *

UNITED STATES PATENT OFFICE
CERTIFICATE OF CORRECTION

Patent No. 3,789,370 Dated April 11, 1974

Inventor(s) JAIME A. BARI, KENT N. MAFFITT, JERRY A. SIEVERS

It is certified that error appears in the above-identified patent and that said Letters Patent are hereby corrected as shown below:

Column 7, Line 49, change "FirSt" to --First--;

Column 9, line 40, change "7" to --6--;

Column 14, Line 7, change "the" to --The--.

Signed and Sealed this

*thirtieth* Day of *March 1976*

[SEAL]

*Attest:*

RUTH C. MASON
*Attesting Officer*

C. MARSHALL DANN
*Commissioner of Patents and Trademarks*